(12) United States Patent
Lee

(10) Patent No.: US 8,127,051 B2
(45) Date of Patent: Feb. 28, 2012

(54) APPARATUS AND METHOD FOR SHARING A BUS IN A MOBILE TELECOMMUNICATION HANDSET

(75) Inventor: Sang-Rae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1629 days.

(21) Appl. No.: 11/485,433

(22) Filed: Jul. 13, 2006

(65) Prior Publication Data

US 2007/0015524 A1 Jan. 18, 2007

(30) Foreign Application Priority Data

Jul. 16, 2005 (KR) .................. 10-2005-0064576

(51) Int. Cl.
*G06F 13/36* (2006.01)
(52) U.S. Cl. .......................... 710/20; 710/58
(58) Field of Classification Search .................. None
See application file for complete search history.

(56) References Cited

U.S. PATENT DOCUMENTS

| | | | | |
|---|---|---|---|---|
| 6,880,076 | B2 * | 4/2005 | Greiner et al. | 713/1 |
| 7,043,649 | B2 * | 5/2006 | Terrell, II | 713/322 |
| 7,212,786 | B2 * | 5/2007 | Kojima et al. | 455/41.2 |
| 7,366,207 | B1 * | 4/2008 | Vaishnav et al. | 370/509 |
| 2006/0256122 | A1 * | 11/2006 | Rai et al. | 345/547 |

FOREIGN PATENT DOCUMENTS

| | | |
|---|---|---|
| CN | 1619523 A | 5/2005 |
| CN | 2710264 Y | 7/2005 |

* cited by examiner

*Primary Examiner* — Cheng-Yuan Tseng
(74) *Attorney, Agent, or Firm* — Birch, Stewart, Kolasch & Birch, LLP

(57) ABSTRACT

An apparatus and method for sharing a bus in a mobile telecommunication handset are provided. In one embodiment, a mobile telecommunication handset comprises a first device, a second device, a shared bus, a memory configured to store a reference clock frequency, and a controller configured to simultaneously receive first data from the first device and transmit second data to the second device via the shared bus based on a clock signal of the reference clock frequency. The first device is configured to forward the first data received by the controller, and the second device is configured to receive the second data transmitted by the controller.

7 Claims, 3 Drawing Sheets

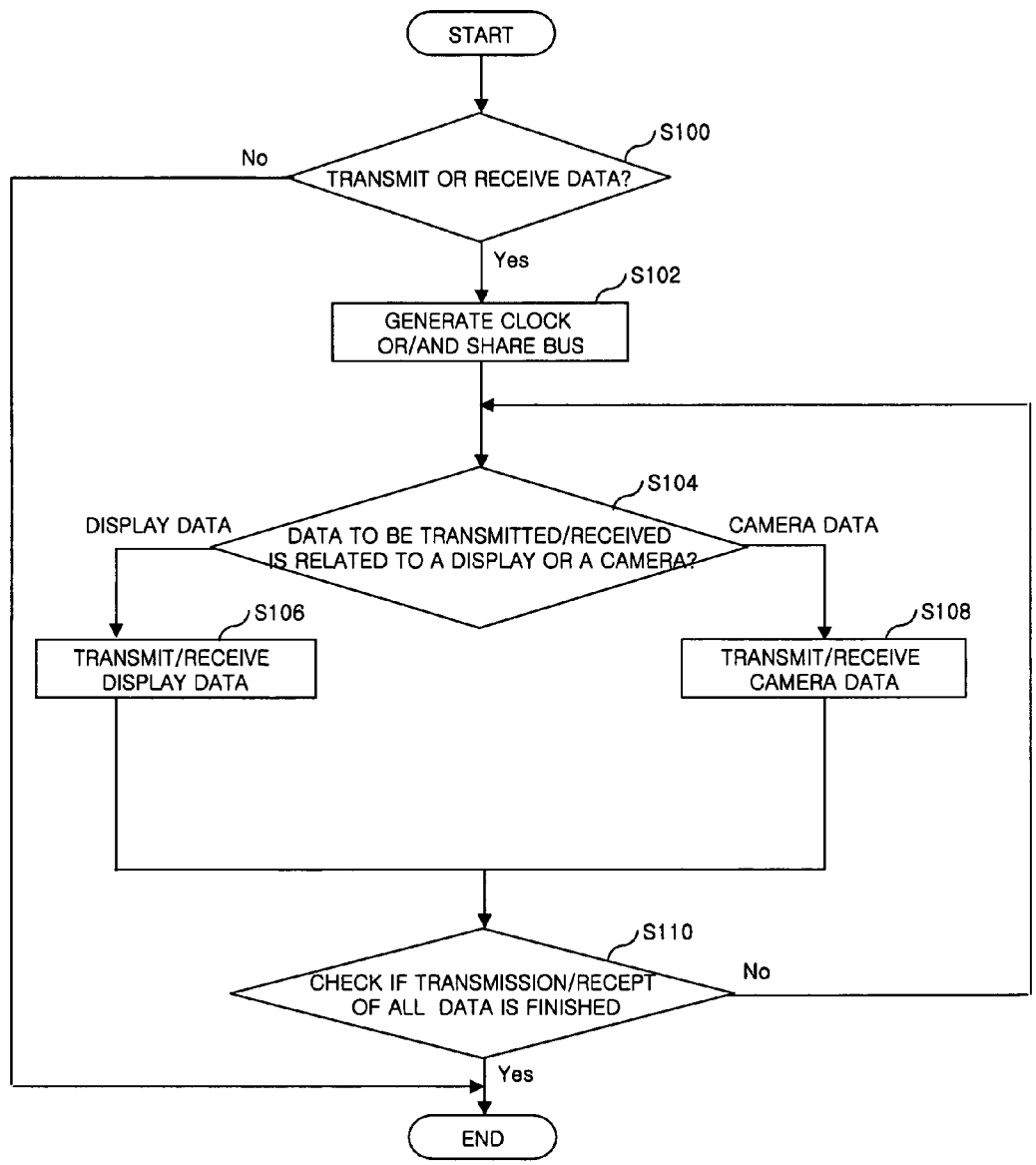

APPARATUS AND METHOD FOR SHARING A BUS IN A MOBILE TELECOMMUNICATION HANDSET

This application claims priority to Korean Patent Application No. 10-2005-0064576 filed in Korea on Jul. 16, 2005, the entire contents of which are incorporated by reference in its entirety.

BACKGROUND OF THE INVENTION

1. Field of the Invention

The present invention relates to a mobile telecommunication handset, and more particularly to an apparatus and method for sharing a bus over which data generated from devices are transmitted and received in the mobile telecommunication handset.

2. Description of the Background Art

A mobile telecommunication service provider generally provides telecommunication-related services to a user, such as a wireless internet connection service, a video-on-demand service, a character and multimedia message transmission service, and a wireless on-line game service, while a manufacturer of the mobile telecommunication handset provides built-in functions which are not related to telecommunication, to the user, such as a camera function, a memo writing function, a schedule managing function, and a morning call function.

To provide these functions, the mobile telecommunication handset uses separate buses over which to transmit and receive data generated from devices in the mobile telecommunication handset.

FIG. 1 is a drawing illustrating buses for a display and a camera in a mobile telecommunication handset according to a related art.

As shown in FIG. 1, for example, the devices such as the display 20 and the camera 30 are connected to a controller 10 through their respective buses. However, the separate connections of the display 20 and the camera 30 to the controller 10 in the conventional mobile telecommunication handset require an additional data pin and a large-sized connector connecting between boards. Therefore, the separate use of the data buses for each of the display 20 and the camera 30 makes it difficult to meet a recent demand for a small-sized mobile telecommunication handset.

SUMMARY OF THE INVENTION

Therefore, an object of the present invention is to make a mobile telecommunication handset (mobile terminal) smaller by sharing a bus assigned to different devices associated with the handset.

Another object of the present invention is to provide a mobile terminal which addresses limitations and disadvantages associated with the related art.

To achieve these and other advantages and in accordance with the purpose of the present invention, as embodied and broadly described herein, there is provided a mobile telecommunication handset including a first device, a second device, and a controller controlling input and output of data by sharing a channel connected to each of the first device and the second device.

According to another aspect of the present invention, there is also provided a method for sharing a bus in the mobile telecommunication handset, including inputting data to and outputting data from devices and controlling the input and output of the data by sharing the bus connected to each of the devices.

In the mobile telecommunication handset as is above described, the first and second devices may be ones which can input and output the data in the mobile telecommunication handset.

In the mobile telecommunication handset as is above described, a high impedance section may be created to reduce interference between the data input to and the data output from the fist and second devices.

In the mobile telecommunication handset as is above described, the controller can generate clock signals necessary to prevent an overlap between the data input to and the data output from the first and second devices.

According to another aspect, the present invention provides a mobile telecommunication handset comprising: a controller enabling a plurality of devices to share a clock and controlling input of data to and output of data from the plurality of devices using the shared clock.

According to another aspect, the present invention provides a mobile communication terminal comprising: a plurality of input/output devices; a controller to control the input/output devices; and a single shared bus over which data to and from each of the input/output devices is communicated with the controller.

According to another aspect, the present invention provides a method for sharing a bus in a mobile telecommunication handset, comprising: synchronizing clocks of devices to transmit and receive input data and output data for the devices; and controlling input and output of the data through the use of the synchronized clocks.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a flow chart illustrating a method for sharing a bus in a mobile telecommunication handset according to an embodiment of the present invention;

DETAILED DESCRIPTION OF THE PREFERRED EMBODIMENTS

Reference will now be made in detail to the preferred embodiments of the present invention, examples of which are illustrated in the accompanying drawings.

The present invention is based on an inventive concept that a bus is shared as it is assigned to each of two or more devices in the mobile telecommunication handset (or mobile terminal).

Figure 1:
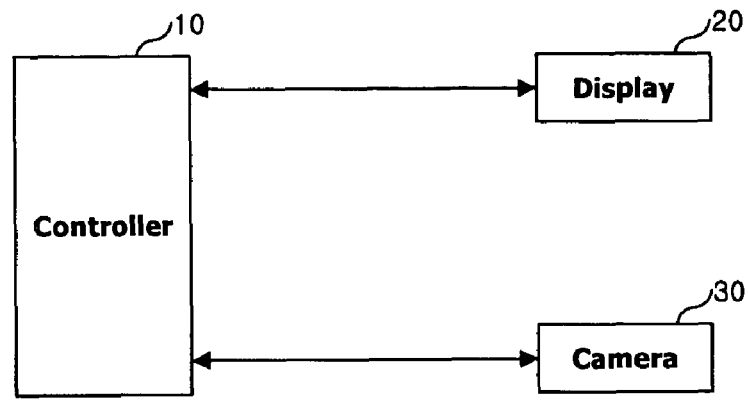
FIG. 1 is a drawing illustrating separate buses for a display and a camera in a mobile telecommunication handset according to a related art.
Figure 2:
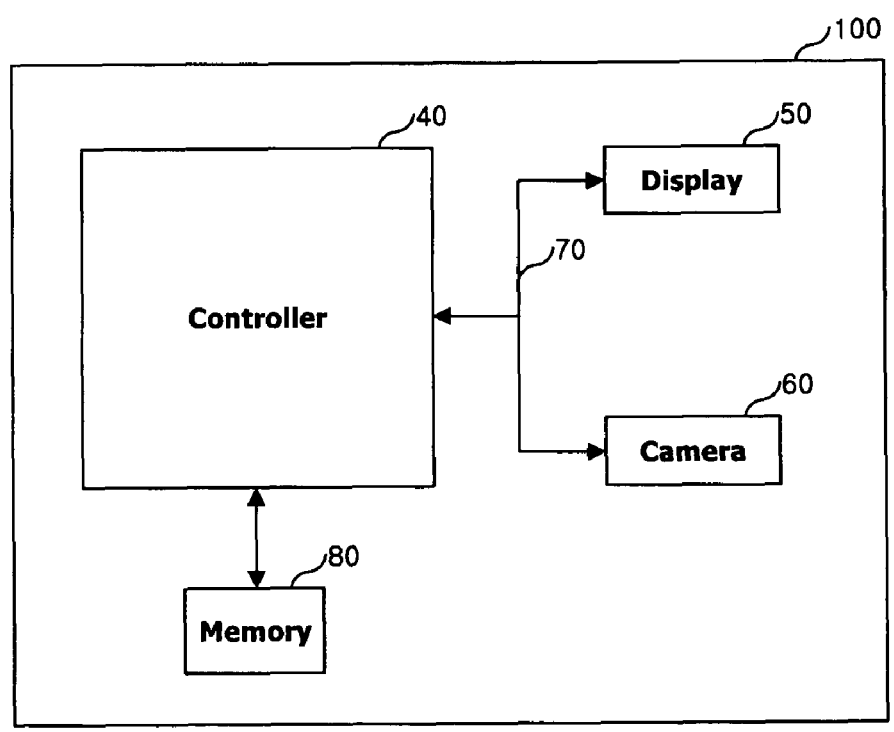
FIG. 2 is a block diagram illustrating an apparatus for sharing a bus in a mobile telecommunication handset according to an embodiment of the present invention.

FIG. 2 is a block diagram illustrating an apparatus for sharing a bus in a mobile telecommunication handset 100 according to an embodiment of the present invention.

As shown in FIG. 2, the apparatus for sharing the bus in the mobile telecommunication handset 100 according to the embodiment of the present invention includes a camera 60 for taking photographs, movie clips, etc. and transmitting the captured image data, a display 50 (e.g., an LCD), a memory 80 for storing a reference clock frequency to generate a signal in a channel (e.g. a shared bus 70) connecting both the camera 60 and the display 50 to a controller 40, and the controller 40 which enables generated data to be sent over the shared channel/bus 70 when the data to be displayed on the display 50 is generated, and which enables input data to be sent over the shared bus 70 when the data is input from the camera 60. The mobile handset 100 includes conventionally known components and functions. All components of the handset 100 including the apparatus for sharing the bus are operatively configured and coupled.

Referring to FIG. 2, an operation of the apparatus for sharing the bus in the mobile telecommunication handset according to the embodiment of the present invention is below described.

For example, when image data captured from the camera 60 is to be stored in the memory 80 through control of the controller 40, or when the data stored in the memory 80 is to be displayed on the display 50, the controller 40 outputs the data stored in the memory 80, which is to be displayed on the display 50, over the shared bus 70 to display the data on the display 50, and/or enables data from the camera 60 to be sent over the shared bus 70 when a camera signal occurs, e.g., so as to store the input data in the memory 80.

The one end of the shared bus 70 is connected to the controller 40 and the other end of the shared bus is connected to both the display 50 and the camera 60. The transmittance and reception of data between the controller 40 and the display 50 and between the controller 40 and the camera 50 is done through one shared bus 70.

A reference clock frequency for generating a signal in the display 50 and the camera 60 and a guard clock frequency for preventing signal shorts caused by proximity of display data and camera unit data to time slot are stored in the memory 80. The guard clock frequency is half of the reference clock frequency. A data bus is maintained as high impedance state.

Figure 3:
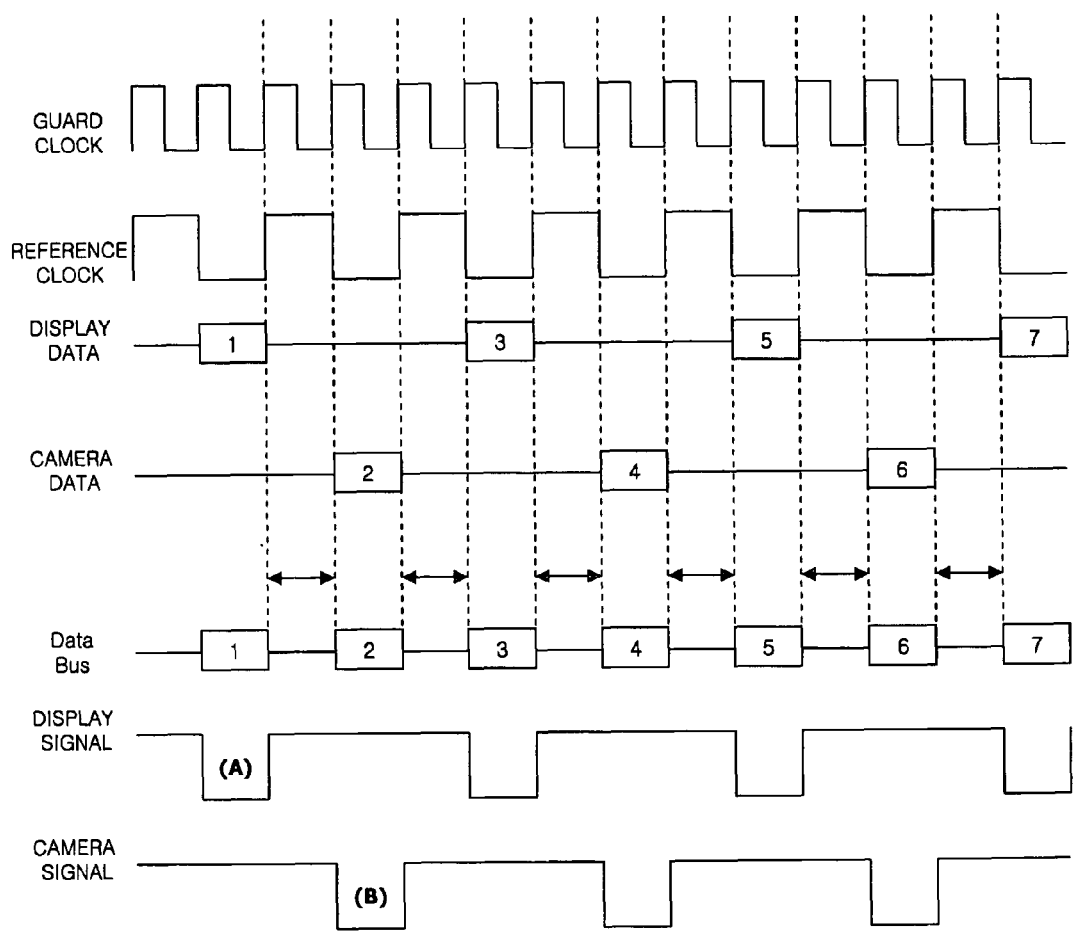
FIG. 3 is a drawing illustrating transmission and reception of data through the shared bus of FIG. 2.

FIG. 3 is a drawing illustrating transmission and reception of data through the shared bus according to an embodiment of the present invention. This operation is applied to the handset 100 of FIG. 2, but can be applied to other suitable devices.

As shown in FIG. 3, the display 50 and the camera 60 share the bus 70 over which to transmit and receive the data which is carried through the reference clock. The reference clock simultaneously carries the display data (e.g., data to be displayed) and the camera data (e.g., data from the camera). A frequency of the clock signal is fast enough to prevent an overlap between the data input to and the data output from the display 50 and the camera 60. The data bus is maintained as high impedance state by the use of the guard clock frequency for preventing the signal shorts which can be caused by proximity of the display data and the camera data to the time slot, thus preventing interference between the display data and the camera data.

As shown in FIG. 3, a section A indicates a pulse by which data is transmitted to the display 50 through the shared bus 70, and a section B indicates a pulse by which data is input from the camera 60 through the shared bus 70. The display data and the camera data are interpersedly carried over the same shared bus 70 in an effective manner. Although the camera 60 and the display 50 are discussed as examples only, other input/output devices can input and output their respective data through the shared bus 70 by differentiating between their respective clocks according to the present invention.

FIG. 4 is a flow chart illustrating a method for sharing a bus in a mobile telecommunication handset according to another embodiment of the present invention. This method is applied to the handset 100 of FIG. 2, but can be applied to other devices.

Referring to FIG. 4, the method for sharing the bus in the mobile telecommunication handset according to the embodiment of the present invention is below described.

The controller 40 generate a fast-enough clock when data is input to and output from input/output devices (e.g. an LCD, a USB port, a camera, an infrared port, or a data connector, or the like) provided in or associated with the mobile telecommunication handset 100, and then shares the bus 70 over which to transmit data related to each of the input/output devices (S100 and S102). The controller 40 determines which of the input/output devices the data to be transmitted and/or received is related to (e.g., determines if the data is related to the display or the camera) (S104)

When the controller 40 determines that the data input to and output from the display 50, i.e., the data related to the display 50, is transmitted and received, the controller 40 performs synchronization with the frequency of the reference clock and transmits the related data over the bus 70 using the synchronized pulse (S106). When the controller 40 determines that data input to and output from the camera 60, i.e., the data related to the camera 60, is transmitted and received, the controller 40 receives the related data over the bus 70 using the pulse synchronized with the reference clock frequency. (S108)

When the transmitting and/or receiving of the data related to each of the input/output devices is finished, the controller 40 checks if all the related data is transmitted and received, and if not completely transmitted and/or received, goes back to determining (S104) which of the input/output devices has the data that has not been completely transmitted and/or received (S10).

Accordingly, the present invention allows the simultaneous transmission of data related to different devices through one shared bus. This makes it possible to remove a need to add extra the data pin(s) depending on the number of the devices which are incorporated in the mobile telecommunication handset for the user convenience and to meet a recent demand for a small-sized mobile telecommunication handset.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile telecommunication handset, comprising:
   a first device configured to generate first data;
   a second device configured to process second data;
   a shared bus;
   a memory configured to store a reference clock frequency; and
   a controller coupled to the first device and the second device via the shared bus, the controller configured to simultaneously receive the first data from the first device and transmit the second data to the second device via the shared bus based on a clock signal of the reference clock frequency, wherein the first device is configured to forward the first data received by the controller and the second device is configured to receive the second data transmitted by the controller; and generate a guard clock to separate the first data from the second data based on the guard clock frequency, wherein the first data is carried via a first pulse by which the first data is received from the first device and the second data is carried by a second pulse by which the second data is transmitted to the second device, and wherein the first pulse and the second pulse are interspersed according to the reference clock frequency.

2. The mobile telecommunication handset according to claim 1, wherein the controller comprises a module for determining to which of the devices the data is to be input and from which of the devices the data is to be output.

3. The mobile telecommunication handset according to claim 1, wherein the controller is configured to generate a high impedance to reduce interference between the first data from the first device and the second data to the second device.

4. The mobile communication handset according to claim 1, wherein the first device comprises a camera device and the second device comprises a display device.

5. The mobile telephone handset according to claim 1, wherein a frequency of the guard clock is half of the reference clock frequency.

6. A method of controlling a mobile telecommunication handset having a memory, a first device configured to generate first data, a second device configured to process second data, and a controller coupled to the first device and the second device via a shared bus, the method comprising:

simultaneously receiving the first data from the first device and transmitting the second data to the second device by the controller via the shared bus based on a clock signal of a reference clock frequency stored in the memory; and generating a guard clock to separate the first data from the second data based on the guard clock frequency, wherein the first data is carried via a first pulse by which the first data is received from the first device and the second data is carried by a second pulse by which the second data is transmitted to the second device, and wherein the first pulse and the second pulse are interspersed according to the reference clock frequency.

7. The method of claim 6, wherein a frequency of the guard clock is half of the reference clock frequency.

* * * * *